United States Patent [19]

Beard et al.

[11] Patent Number: 4,611,061

[45] Date of Patent: Sep. 9, 1986

[54] 2'-HYDROXY-5'-(HYDROXYALKYL)PHE-NYL-2H-BENZOTRIAZOLES

[75] Inventors: Charles D. Beard, Sierra Madre; Namassivaya Doddi, Upland, both of Calif.; Akira Yamada, Kyoto, Japan

[73] Assignee: Iolab Corporation, Covina, Calif.

[21] Appl. No.: 592,764

[22] Filed: Mar. 26, 1984

[51] Int. Cl.⁴ ............................................ C07D 249/18
[52] U.S. Cl. ..................................... 548/260; 548/259
[58] Field of Search ............................... 548/259, 260

[56] References Cited

U.S. PATENT DOCUMENTS

| | | | |
|---|---|---|---|
| 3,074,910 | 1/1963 | Dickson, Jr. | 548/260 |
| 3,213,058 | 10/1965 | Boyle et al. | 548/260 |
| 4,001,266 | 1/1977 | Rody et al. | 548/260 |

Primary Examiner—Lester L. Lee
Attorney, Agent, or Firm—Wayne R. Eberhardt

[57] ABSTRACT

The compounds 2'-hydroxy-5'-(hydroxyalkyl)phenyl-2H-benzotriazoles are useful as intermediate alcohols in the preparation of corresponding 2'-hydroxy-5'-acrylyloxyphenyl-2H-benzotriazole monomers, which in turn are copolymerizable with ethylenically unsaturated monomers, particularly acrylic monomers, to impart ultraviolet absorbing properties to the resulting copolymers.

6 Claims, No Drawings

2'-HYDROXY-5'-(HYDROXYALKYL)PHENYL-2H-BENZOTRIAZOLES

BACKGROUND OF THE INVENTION

This invention relates to ultraviolet light absorbing polymer compositions, and more particularly, to polymer compositions comprising copolymers of 2'-hydroxy-5'-acrylyloxyalkylphenyl-2H-benzotriazoles with one or more other monomers copolymerizable therewith, particularly acrylic monomers. This invention further relates to the compounds 2'-hydroxy-5'-(hydroxyalkyl)phenyl-2H-benzotriazoles which are useful in the preparation of the aforesaid 2'-hydroxy-5'-acrylyloxyalkylphenyl-2H-benzotriazoles.

The absorption of radiation in the ultraviolet range by polymeric materials is a major cause of light-induced degradation of such materials. It is standard practice to add a low molecular weight UV "stabilizer" to light-sensitive polymers to absorb the light in the destructive range or to quench the energy generated as a result of the excitation of the light-absorbing functional groups in the polymer.

Although low molecular weight UV absorbers or quenchers of various types are effective in inhibiting or retarding the destruction of the polymers to which they are added, their extractibility in various media and/or their volatility during the processing or fabrication of the polymers at elevated temperatures provide a limitation on their utility.

This problem has been remedied to a considerable extent by the synthesis of copolymerizable monomers containing structural moieties capable of functioning as UV absorbers or quenchers. The copolymerization of such monomers results in the formation of copolymers with increased stability, i.e. resistance to degradation upon exposure to UV light, with decreased extractibility and volatility. The addition of such copolymers to a suitable matrix polymer imparts these properties to the latter.

While the hydroxybenzophenones copolymerizable with acrylate monomers are effective UV absorbers and form chemically stable copolymers, relatively large amounts, i.e. 3 to 10% by weight, must be incorporated in the polymer to obtain 85% UV absorption at 400 nm and 1 mm thickness, and the compounds exhibit very broad absorption bands which extend into the visible range. Thus, polymers containing sufficient amounts of the benzophenone to provide effective UV absorption often have a significantly yellow cast.

As disclosed in my copending application Ser. No. 512,860 filed July 11, 1983, now U.S. Pat. No. 4,528,311, which disclosure is incorporated herein by reference, 2'-hydroxy-5'-acrylyloxyalkylphenyl-2H-benzotriazoles of the structure

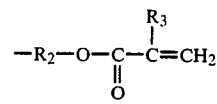

wherein X is H or halogen, each $R_1$ is selected from the group consisting of H, $CH_3$, tert-alkyl of 4 to 6 carbons and

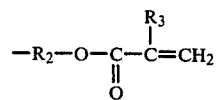

wherein $R_2$ is $C_2$-$C_{10}$ alkylene which may be straight chain or branched, and $R_3$ is H or $CH_3$, provided that one $R_1$ is H, $CH_3$, or tert-alkyl and the other $R_1$ is $$-R_2-O-C-\underset{O}{\overset{R_3}{\underset{\|}{C}}}=CH_2$$

are copolymerizable with vinyl monomers such as methyl methacrylate to yield optically clear polymers having excellent ultraviolet light absorbing characteristics and being useful in the preparation of intraoccular and contact lenses and in other applications that require such characteristics.

It is accordingly an object of the present invention to provide novel benzotriazole phenyl alcohols useful as intermediates in the preparation of 2'-hydroxy-5'-acrylyloxyalkylphenyl-2H-benzotriazoles.

SUMMARY OF THE INVENTION

There is provided as a new composition of matter 2'-hydroxy-5'-(hydroxyalkyl)phenyl-2H-benzotriazoles of the structure

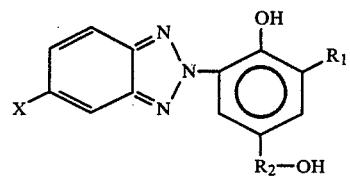

wherein
X is H, halogen or $-OCH_3$;
$R_1$ is selected from the group consisting of H, $CH_3$, and n-, sec- and tert-alkyl of 4 to 6 carbons; and
$R_2$ is a $C_n$ alkylene which may be straight chain or branched wherein n is from 2 to 10.

DETAILED DESCTIPTION

The benzotriazole phenyl alcohols of the present invention are broadly those compositions defined by the aforesaid structure. Preferred compounds are those where X is H or chlorine, $R_1$ is H or tert-butyl, and $R_2$ is an alkylene wherein n is 2 or 3, which compounds are particularly useful as intermediates in the preparation of the preferred 2'-hydroxy-5'-acrylyloxyalkylphenyl-2H-benzotriazoles as follows:

a. 2-(2'-Hydroxy-5'-hydroxyethylphenyl)-2H-benzotriazole

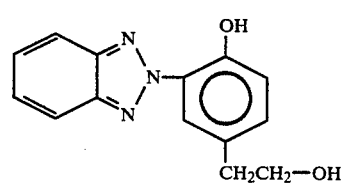

as an intermediate in the preparation of 2-(2'-Hydroxy-5'-methacrylyloxyethylphenyl)-2H-benzotriazole (I);

b. 2-(2'-Hydroxy-5'-hydroxyethylphenyl)-5-chloro-2H-benzotriazole

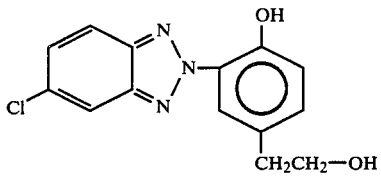

as an intermediate in the preparation of 2-(2'-Hydroxy-5'-methacrylyloxyethylphenyl)-5-chloro-2H-benzotriazole (II);

c. 2-(2'-Hydroxy-5'-hydroxypropylphenyl)-2H-benzotriazole

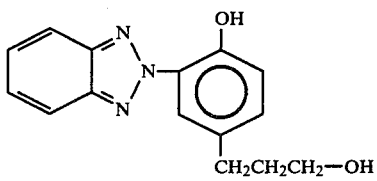

as an intermediate in the preparation of 2-(2'-Hydroxy-5'-methacrylyloxypropylphenyl)-2H-benzotriazole (III);

d. 2-(2'-Hydroxy-5'-hydroxypropylphenyl)-5-chloro-2H-benzotriazole

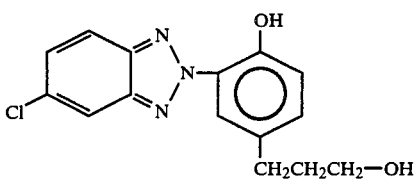

as an intermediate in the preparation of 2-(2'-Hydroxy-5'-methacrylyloxypropylphenyl)-5-chloro-2H-benzotriazole (IV); and e. 2-(2'-Hydroxy-5'-hydroxypropyl-3'-tert-butylphenyl)-5-chloro-2H-benzotriazole

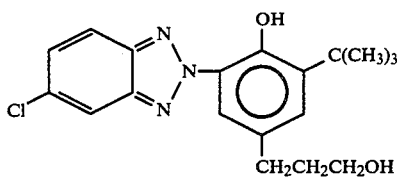

as an intermediate in the preparation of 2-(2'-Hydroxy-5'-methacrylyloxypropyl-3'-tert-butylphenyl)-5-chloro-2H-benzotriazole (V).

A particularly preferred benzotriazole UV absorbing monomer is compound V above. This compound is copolymerizable with methyl methacrylate and other vinyl type monomers and imparts excellent UV absorbing properties to the copolymer even at concentrations of 1.0% or less. The preparation of this monomer via the intermediate of the present invention 2-(2'-Hydroxy-5'-hydroxypropyl-3'-tert-butylphenyl)-5-chloro-2H-benzotriazole is described in the following examples.

EXAMPLE 1

Preparation of Intermediate 3-(3',5'-Di-tert-butyl-4'-hydroxyphenyl)-1-propanol

A solution of methyl 3-(3',5'-di-tert-butyl-4'-hydroxyphenyl) propionate (117 g, 0.4 mol) in 200 ml of anhydrous ether was added dropwise to a mixture of lithium aluminum hydride (17 g, 0.45 mol) and anhydrous ether (800 ml) under an inert atmosphere with ice-water cooling. After the addition was completed, the reaction mixture was heated at reflux temperature for one hour, then cooled to room temperature. To the cooled mixture was added dropwise 80 ml of 3% sodium hydroxide aqueous solution with vigorous stirring and with ice-water cooling. After the addition was completed, the mixture was stirred at room temperature for 30 minutes. A white precipitate was separated by filtration and washed with ether. The filtrate and washings were combined and evaporated. The residue was vacuum distilled to give 101 g (95%) of the product.

EXAMPLE 2

Preparation of Intermediate 3-(3'-tert-Butyl-4'-hydroxyphenyl)-1-propanol 3-(3',5'-Di-tert-butyl-4'-hydroxyphenyl)-1-propanol (100 g, 0.38 mol) was dissolved in 500 ml of trifluoroacetic acid. The solution was stirred at 40° C. for six hours, then poured into an ice-water mixture. The mixture was extracted with methylene chloride. The methylene chloride layer was washed with aqueous sodium carbonate and evaporated. A solution of sodium hydroxide (25 g) in 400 ml of methanol was added to the residue. The mixture was stirred at room temperature for 30 minutes, neutralized with 1N hydrochloric acid and extracted with methylene chloride. The methylene chloride layer was washed with aqueous sodium carbonate and water, dried with anhydrous sodium sulfate, and evaporated. The residue was vacuum distilled to give 51 g (64%) of the product.

EXAMPLE 3

Preparation of Intermediate 2-tert-Butyl-4-hydroxypropyl-6-(4'-chloro-2'-nitro phenylazo)phenol 4-Chloro-2-nitroaniline (72 g, 0.42 mol) was diazotized in the usual manner such as described in the literature [H. E. Fierz-David and L. Blangley, "Fundamental Processes of Dye Chemistry" p. 247 (Interscience, New York 1949)]. The diazonium salt solution was added dropwise to a stirred mixture of 3-(3'-tert-butyl-4'-hydroxyphenyl)-1-propanol (88.5 g, 0.42 mol), concentrated hydrochloric acid (108 g), water (920 ml) and sodium lauryl sulfate (10 g) at 40° C. The mixture was stirred at 40° C. for sixteen hours, then allowed to stand. After the azo dye settled, the supernatant liquid was decanted. The azo dye was washed with warm water, and the washings decanted. The azo dye was used in Example 4 without further purification.

EXAMPLE 4

Preparation of
2-(2'-Hydroxy-5'-hydroxypropyl-3'-tert-butylphenyl)-5-chloro-2H-benzotriazole The azo dye of Example 3 was dissolved in 1.7 l of ethanol. A solution of 151 g of glucose in 1.7 l of 2N sodium hydroxide was added to the azo dye solution. The mixture was stirred at room temperature and, after 24 hours of stirring, 131 g of zinc dust was added to the reaction mixture. The mixture was stirred for another two hours at room temperature. The zinc was separated by filtration and washed with ethanol, methylene chloride and ethanol. The filtrate and washings were combined and acidified with concentrated hydrochloric acid. The aqueous layer was extracted with methylene chloride. The combined organic layer was washed with 1N hydrochloric acid and water, dried with potassium carbonate and evaporated. The residue was vacuum distilled to give 107 g (61%) of the benzotriazole. The distillate was further purified by column chromatography and recrystallization. A pure sample showed a m.p. of 110°–111° C. and λ max peaks at 311 and 350 nm ($\epsilon_{311}=1.44\times10^4$, $\epsilon_{350}=1.58\times10^4$ 1 mol$^{-1}$ cm$^{-1}$).

EXAMPLE 5

Preparation of Monomer
2-(2'-Hydroxy-5'-methyacrylyloxypropyl-3'-tert-butylphenyl)-5-chloro-2H-benzotriazole Methacrylyl chloride (5.9 ml) and triethylamine (8.5 ml) were added dropwise at −5° C. to a solution of 2-(2'-hydroxy-5'-hydroxypropyl-3'-tert-butylphenyl)-5-chloro-2H-benzotriazole (20 g) in 250 ml of methylene chloride. The reaction mixture was stirred at 0° C. overnight and then washed with 1N hydrochloric acid and water. The methylene chloride solution of the product was dried with sodium sulfate, passed through alumina column and evaporated. The crude yield of the product was 22 g (90%). A polymerization grade sample was obtained by recrystallization from methanol—methylene chloride mixture, m.p. 74.5°–76.5° C.

EXAMPLE 6

Preparation of
2-(2'-Hydroxy-5'-hydroxyethylphenyl)-2H-benzotriazole

A 2000 ml, three-necked flask was equipped with mechanical stirring, an addition funnel and a thermometer. Concentrated hydrochloric acid (150 ml, 1.8 mole) was placed in the reaction vessel and solid o-nitroaniline (55.2 g, 0.4 mole) was added with stirring. The slurry was cooled in an ice bath and a solution of sodium nitrite (27 g, 0.39 mole) in water added dropwise while maintaining the internal temperature in the range of 0°–5° C. by external cooling. The solution was filtered to remove a small amount of solid particles.

A solution of p-hydroxyphenethyl alcohol (55.2 g, 0.4 mole), sodium hydroxide (16 g, 0.4 mole), and sodium carbonate (120 g, 1.13 mole) in 600 ml of water was prepared and added dropwise to the reaction vessel with stirring over a period of 30 minutes while maintaining the internal temperature at 15°±3° C. The intermediate azo compound separated as a dark red oil which partially solidified after two hours. It was collected by filtration in a sintered glass funnel and dissolved in 400 ml of 2N sodium hydroxide solution. Zinc dust (120 g, 1.84 mole) was added to the solution in portions over a period of three hours while at the same time 200 ml of 25% sodium hydroxide solution was added dropwise. After completion of the addition, the suspension slowly changed from red to green in a mildly exothermic reaction. The mixture was heated at 70° C. for one hour to complete the reaction, cooled to room temperature and filtered to remove zinc salts. The dark, brown filtrate was acidified with concentrated hydrochloric acid solution and the solid product was collected by suction filtration and dried in air. The crude solid was distilled on the Kugelrohr (220° C., 0.1 mm) giving a yellow oil which solidified in the receiver. Crystallization twice from acetone gave the product as a nearly colorless solid (32.64 g, mp 126°–127° C.).

In a like manner there are prepared 2-(2'-Hydroxy-5'-hydroxyethylphenyl)-5-chloro-2H-benzotriazole, 2-(2'-Hydroxy-5'-hydroxypropylphenyl)-5-chloro-2H-benzotriazole and 2-(2'-Hydroxy-5'-hydroxypropylphenyl)-2H-benzotriazole from which the corresponding methacrylyloxyalkylphenyl-2H-benzotriazoles are readily prepared in good yield and purity following the general procedures set forth above.

The homopolymers and copolymers of the benzotriazoles prepared from the compounds of the present invention find wide application in formulating UV absorbing plastics and other organic materials wherever such materials are exposed to UV radiation from either natural or artificial sources. In addition to the medical use in intraoccular and contact lenses described previously, such polymers are useful in many industrial applications such as in solar energy collectors, polymeric coatings, transparent plastic films, fluorescent light diffusers, packaging materials, vinyl window coverings, automobile paints and interior coverings, epoxys, fiberglass constructions and the like. Many other applications will be readily apparent to those familiar with this art.

We claim:
1. A compound of the formula

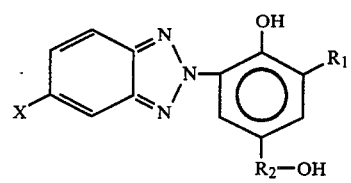

wherein
  X is halogen or —OCH$_3$;
  R$_1$ is selected from the group consisting of CH$_3$, and n-, sec- and t-alkyl of 4 to 6 carbons; and
  R$_2$ is a C$_n$ alkylene which may be straight chain or branched wherein n is from 2 to 10.
2. The compound of claim 1 wherein X is chlorine.
3. The compound of claim 1 wherein R$_1$ is t-butyl.
4. The compound 2-(2'-Hydroxy-5'-hydroxyethylphenyl)-5-chloro-2H-benzotriazole.
5. The compound 2-(2'-Hydroxy-5'-hydroxypropylphenyl)-5-chloro-2H-benzotriazole.
6. The compound 2-(2'-Hydroxy-5'-hydroxypropyl-3'-tert-butylphenyl)-5-chloro-2H-benzotriazole.